March 4, 1941.   W. F. SMITH   2,233,434
CERAMIC SUPPORT
Filed Dec. 6, 1937

*William F. Smith*
INVENTOR

BY *Arthur L. Davis*

ATTORNEY

Patented Mar. 4, 1941

2,233,434

UNITED STATES PATENT OFFICE 2,233,434

CERAMIC SUPPORT

William F. Smith, Knoxville, Tenn.

Application December 6, 1937, Serial No. 178,236

2 Claims. (Cl. 25—153)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the art of firing ceramic ware in kilns and particularly to an improved ceramic support element.

One of the objects of this invention is to provide a support for formed ceramic flatware which will not only provide a substantial support for the ware in those zones of maximum deformation but will make it possible to fire formed ceramic ware more uniformly and in a shorter period of time. Another object of this invention is to provide a support for formed ceramic flatware articles which will hold the articles in substantially perfect alignment during firing notwithstanding the presence of internal strains resulting from the process of forming these articles. Another object of this invention is to provide support elements for use in firing a plurality of ceramic flatware articles in order that assemblies containing a large number of these articles may be fired with the production of a maximum number of perfect articles as a result of the firing. Other objects of this invention includes the provision for firing formed ceramic flatware articles in an economical manner on ceramic support elements which may be economically reused by firing successive assemblies of the articles.

Ceramic flatware is easily formed by jiggering or casting from semi-vitreous or hotel china type bodies, but such articles present a difficult problem in delivering the ware straight from the firing kiln. Deformation in fired ceramic articles is caused for the most part by internal strains arising from one or more of the following sources: characteristics of the plastic body from which the articles are formed, method of forming the ceramic articles, and skill or lack of skill exhibited during the forming operation. These internal strains are subsequently evidenced, first, during the drying of the formed ceramic article, and second, during the firing of the dried formed ceramic articles. Kiln placing methods, such as used in the manufacture of true porcelain, Belleek, and bone china, result in a satisfactory product but the kiln capacities are severely restricted. This latter objectionable feature might be overcome provided a kiln fill equal to or better than that obtained using semi-vitreous or hotel china type ware could be employed wherein sand, calcined kaolin and mixture of calcined kaolin and alumina are filled in between the plates. This has not, however, been hitherto attained particularly in connection with the use of porcelain type ceramic ware. In the hitherto known methods of firing, the processes commonly used do not provide any way for bracing the centers of the ware, which have a tendency to drop if the ware is thin; the processes used do not make it possible to stack the ware to a sufficient height, say not more than 12 high; the processes used do not appear to overcome strains which are introduced into the ware during the forming operation; the processes used have a tendency to show up the internal strains after a biscuit is fired in spite of the bracing; the materials used for bracing carry an excessive amount of dust; the materials used for bracing considerably affect the translucency of the ware and have a tendency to pack and fuse into the ware; and the materials used for bracing have to be reground or otherwise treated before reuse.

I have discovered a ceramic ware support element for use in a vertically aligned assembly of a plurality of superposed fired ceramic ware support elements and a plurality of unfired ceramic articles in which each article is between two support elements. The respective ceramic ware support elements are comprised of a ring with an upper side in a true horizontal plane, with a uniform thickness in at least three zones and with the thickness of a plurality of intermediate zones less than that of the zones of uniform thickness; a flange integral with the ring, inwardly declined with the upper side of the flange complementary to a portion of the reverse of an unfired ceramic article at the rim of the latter, and the lower side of the flange adjacent to the ring at the zones of uniform thickness complementary to a portion of the obverse of another ceramic article in the assembly immediately below the first mentioned ceramic article at the rim of the former with a space between the lower side of the flange and the obverse of the second ceramic article within the tolerance limit of the ceramic article; a plurality of arms integral with the flange and inwardly declined; and a center portion, provided with an aperture, integral with the ends of the arms opposite the flange, with the horizontal upper side of such size and so positioned as to support at least the periphery of the central area of the reverse of the first mentioned ceramic article.

In the accompanying drawing which forms a part of the specification, and wherein reference symbols refer to like parts wherever they occur—

Figure 1:
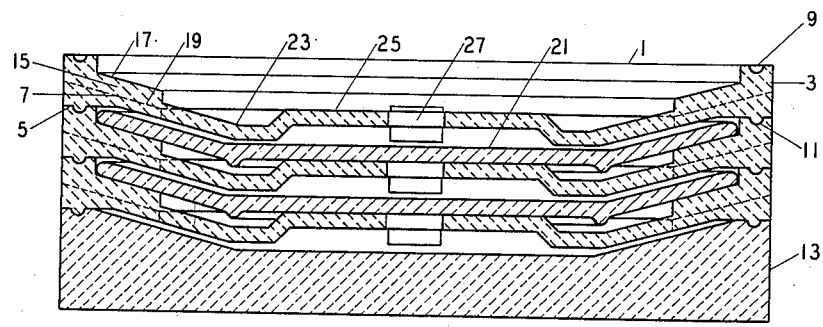
Fig. 1 is a vertical sectional view of an assembly of fired ceramic supports and a plurality of formed ceramic articles, (with only two such articles shown for purposes of illustration), assembled on a fired refractory setter.
Figure 2:
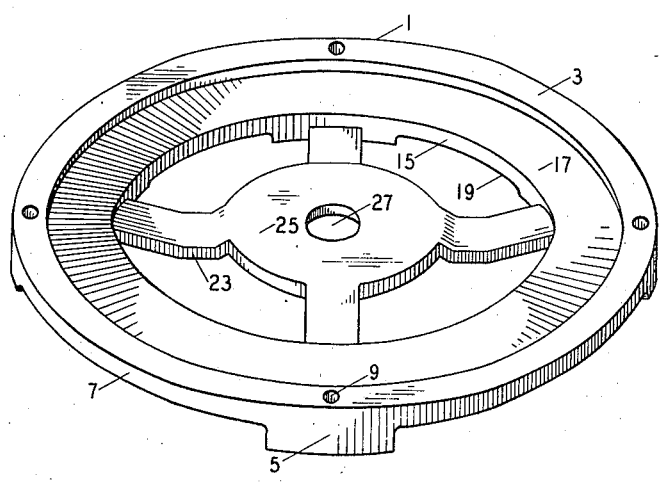
Fig. 2 is a perspective view of one of the fired ceramic supports, detached from the assembly shown in Fig. 1.

In Fig. 1 and Fig. 2 a fired ceramic support 1, is provided with a ring 3, with an upper side in a true horizontal plane with a uniform thickness in a plurality of zones represented by zone 5, and with the thickness of a plurality of intermediate zones, represented by zone 7, less than that of the zones of uniform thickness. The plurality of zones of uniform thickness represented by zone 5, are each provided on one side with a pilot stud recess 9, and on its other side with a pilot stud 11, allowing inter-engagement of the studs and recesses when the supports are assembled on the refractory setter 13. Adjacent to and integral with the ring 3, an inwardly projecting flange 15 is provided whose upper side 17 and lower side 19 are both inwardly declined corresponding to the reverse and obverse sides, respectively, of the plurality of finished ceramic articles, represented by ceramic article 21. The ceramic article 21, is supported at the rim by the upper side 17, of the fired ceramic support. Integral with the flange 15, are a plurality of arms, represented by arm 23, inwardly declined and converging to a center portion 25, provided with an aperture 27. The center portion 25, supports the bottom of the ceramic article 21. The plurality of zones represented by zone 5, adjacent to the junction of the flange 15, and the arm 23, are of such proximity to the obverse of the ceramic article 21, so as to maintain same within the tolerance limit of the ceramic article after firing.

It is evident that there are numerous factors which will influence conditions for the most satisfactory operation of my invention, the actual limits of which cannot be established except by a detailed study of each set of raw materials and finished products involved.

The ceramic support elements are preferably made from a body which will not impart any undesirable discoloration during firing, but, of course this will depend upon the material of the ware being fired, the temperature to which it is fired and the nature of the atmosphere in which it is fired.

The ceramic support elements may be formed by conventional methods such as jiggering or casting. In order, however, that the elements may be uniform to obtain perfect horizontal and vertical alignment during assembly, it is generally necessary to machine a part or all of the respective faces of the element before firing or after firing in order that the fired support elements prepared for use may have the necessary uniformity.

The support elements used in an assembly for firing a plurality of ceramic articles, should all have substantially the same coefficient of expansion. Furthermore they should be of such a composition that they do not exhibit any appreciable plasticity at the temperature of firing of the ware in order that there be practically no deformation of the supports and consequently provide accurate support for the ware.

Each support element is provided with a ring of uniform thickness in at least three zones or an equivalent for the purposes of accurate vertical alignment. Each ring is provided in the zones intermediate to the zones of uniform thickness with an aperture or apertures suitable for admitting the heated gaseous atmosphere contained within the firing zone in order that the ware being fired may be heated more uniformly. Generally the ware so heated can be brought to the desired maturity in a shorter period of time than is possible by conventional methods. By more uniformly heating the ceramic articles during the various stages of firing it is possible to obtain less deformation than would otherwise result.

The ceramic flatware articles may be formed by conventional methods, such as jiggering or casting. This invention relates specifically to the support elements used in the production of ceramic flatware articles with an exterior edge or rim of any desired shape. This invention is particularly adapted for use in the production of ceramic flatware articles having intricate design on the obverse and/or rim.

The zones of deformation of a formed ceramic flatware article during firing are first, the center of the article at which gravity probably exerts the most predominate influence, second, the zone through the center line of the foot and third, and by far the most important, the exterior rim of the article where deformation is caused by gravity on the one hand and marked unevenness by the effect of intenal strains in the body of the formed ware on the other hand.

Deformation of ceramic flatware articles during firing can be substantially reduced by firing stacks of flatware articles with their respective zones of most serious deformation, supported by an element which has a central portion of such size and so positioned as to support at least the periphery of the central area of the reverse of the ceramic article and a flange, connected by arms to the center portion, inwardly declined with the upper side of the flange complementary to a portion of the reverse of the ceramic article at the rim of the latter. In addition, each such flange has a lower side which is complementary to a portion of the obverse of another ceramic article in the assembly, immediately below the first mentioned ceramic article, at the rim of the former with a space between the lower side of the flange and the obverse of the ceramic article within the tolerance limit of the ceramic article. This maintains the ceramic article being fired in positive alignment throughout the entire firing operation.

It is generally desirable to use a true shape refractory setter with its obverse side so shaped as to be complementary to the reverse of one of the ceramic support elements.

In assembling the ceramic support elements and the unfired ceramic ware alternately, the support elements may be vertically aligned in an alignment rack or the support elements may be originally provided with the necessary pilot studs and pilot stud recesses or their equivalent.

It may be necessary to separate the unfired ceramic articles and the support elements from each other, when assembled for firing the former, by the use of a finely divided refractory which is substantially neutral to the body from which these elements are made at the temperature of subsequent firing. A finely divided alumina, such as finer than 150 mesh, has been found suitable for this purpose.

An assembly of ceramic support elements and unfired ceramic articles are fired under conditions of temperature, time and atmosphere to obtain the desired maturity. During the firing there is appreciable shrinkage of all the originally unfired ceramic articles in the assembly with this shrinkage varying considerably with the plastic material from which the articles are formed. They may, for example, vary from 8 to 18%.

After firing the assembly is dismantled and the finely divided refractory adhering to the fired ceramic articles is removed from the articles and the support elements inspected and made available for use in firing subsequent assemblies.

Certain terms used throughout the description and claims are understood to have the following meaning: "obverse" refers to the top of the article or element as assembled for firing regardless of how the article or element is actually formed and likewise "reverse" refers to the bottom of the article or element as assembled for firing regardless of how the article or element is actually formed.

It will be seen, therefore, that this invention actually may be carried out by the use of various modifications and changes without departing from its spirit and scope, with only such limitations placed thereon as are imposed by the prior art.

I claim:

1. In a vertically aligned assembly of a plurality of superposed fired ceramic ware support elements and a plurality of unfired ceramic articles in which each article is between two support elements, a ceramic ware support element which comprises a continuous outer portion of substantially uniform width having alternate thin and thick zones and defining a space of greater extent than that occupied by a ceramic article, the thick zones of said outer portion being contiguous with like thick zones of a subjacent support element whereby said thin zones are separated from said subjacent support element for effecting circulation of a fluid heating medium through said support elements; an inwardly declined continuous portion integral with said outer portion for supporting the reverse of the superposed unfired ceramic article adjacent to the rim of said article; a plurality of spaced inwardly declined arms integral with said declined portion; and a continuous center portion integral with the ends of said arms opposite said outer portion for supporting the central area of the reverse of the ceramic article.

2. In a vertically aligned assembly of a plurality of superposed fired ceramic ware support elements and a plurality of unfired ceramic articles in which each article is between two support elements, a ceramic ware support element which comprises a continuous outer portion of substantially uniform width having alternate thin and thick zones and defining a space of greater extent than that occupied by a ceramic article, the thick zones of said outer portion being contiguous with the thick zones of like outer portions of a superposed support element and a subjacent support element respectively whereby said thin zones are separated from said superposed support element and said subjacent support element for effecting circulation of a fluid heating medium through said support elements; an inwardly declined continuous portion integral with said outer portion for supporting the reverse of the superposed unfired ceramic article adjacent to the rim of said article; a plurality of spaced inwardly declined arms integral with said declined portion; and a continuous center portion integral with the ends of said arms opposite said outer portion for supporting the central area of the reverse of the ceramic article.

WILLIAM F. SMITH.